United States Patent [19]
Reinmuth

[11] 3,854,967
[45] Dec. 17, 1974

[54] HIGH TEMPERATURE- AND CORROSION-RESISTANT MATERIAL

[75] Inventor: Klaus Reinmuth, Durath, Germany

[73] Assignee: Elektroschmelzwerk Kempten GmbH, Munich, Germany

[22] Filed: June 27, 1973

[21] Appl. No.: 374,012

[30] Foreign Application Priority Data
July 7, 1972 Germany............................ 2236437

[52] U.S. Cl.................................. 106/65, 106/73.4
[51] Int. Cl............................................ C04b 35/58
[58] Field of Search............................ 106/65, 73.4

[56] References Cited
UNITED STATES PATENTS

| | | | |
|---|---|---|---|
| 2,839,413 | 6/1958 | Taylor.................................. | 106/65 |
| 3,108,887 | 10/1963 | Lenie et al............................ | 106/65 |
| 3,718,490 | 2/1973 | Morgan et al. ...................... | 106/65 |

*Primary Examiner*—J. Poer
*Attorney, Agent, or Firm*—Francis M. Crawford

[57] ABSTRACT

The present invention relates to refractory, corrosion-resistant materials, suitable for the production of crucibles and the like, produced by compressing at elevated temperatures and pressures mixtures comprising 10–16 percent, by weight, of aluminum nitride and 90–40 percent, by weight, of boron nitride containing 5–25 percent, by weight, of boron oxide.

2 Claims, No Drawings

HIGH TEMPERATURE- AND CORROSION-RESISTANT MATERIAL

The present invention relates to refractory, corrosion-resistant materials comprising 10–60 percent, by weight, of aluminum nitride and 90–40 percent, by weight, of boron nitride containing 5–25 percent, by weight, of boron oxide, and to the production of said materials by compressing said mixture of ingredients at temperatures of the order of 1,500°–2,200°C and pressures of the order of 30–200 kg/cm².

It is well known in the prior art that the nitrides of such elements as aluminum, boron and silicon may be sintered into shaped articles having technically attractive densities and strengths with the aid of suitable binders (British Pat. No. 887,658).

It is also well known that boron oxide, calcium oxide, silicon dioxide, titanium dioxide, aluminum oxide, as well as other oxides, may be used as binders for boron nitride. The use of boron oxide, for example, as a binder, however, while giving a shaped article having good densification, is not very refractory and absorbs water and hence products thus prepared are unsuitable for many purposes, such as crucibles.

Other types of previously suggested binders have likewise been found to be unsuitable for various reasons. For example, many of them require the use of impractically large proportions of the binder with the result that the particularly desirable properties of the boron nitride, such as its slipperiness, its easy machinability and its strength at high temperatures are lost.

It has now been discovered, in accordance with the present invention, that shaped refractory articles, substantially free from the above and other disadvantages, can be produced when the binding of the ingredients is effected with the new type of bonding agent disclosed herein. That is when 10–60 percent, by weight, of aluminum nitride, is hot pressed at temperatures of the order of 1,500°–2,200°C and at pressures of the order of 30–200 kg/cm², with 90–40 percent, by weight, of boron nitride containing 5–25 percent, by weight, of boron oxide.

It is assumed that under the conditions of the above described reaction the binding agent is an intermediate reaction product of the above-stated ingredients and that during the reaction between the aluminum nitride and the boron oxide phase presumably nitrogen and oxygen at least partially become exchanged so that, depending upon the sintering conditions, a mixture of the following character results: boron nitride, $Al_2O_3 \cdot 2\,B_2O_3$, aluminum oxynitride having the formula $Al_{(8/3\,+x/3)}O_{(4-x)}N_x$ *, aluminum oxide and perhaps some other oxide/oxynitride mixed phases. This mixture of materials hereafter is simply referred to as "binder."

*$x$ has a value between 0 and 4. cf ASTM x-ray data sheets Nos. 18-51 and 18-52.

As the reaction product obtained under the above conditions is corrosion-resistant and also resists high temperatures and temperature changes it is particularly suitable for use in the production, processing and testing of metals in the molten state.

The following specific examples will serve to illustrate the invention. It should be understood, however, that it is not limited to the specific temperatures or pressures set forth nor to any particular explanations of the reactions which take place.

EXAMPLES

In the hot pressing of the mixtures of aluminum nitride and boron nitride use was made of boron nitride power containing boron oxide finely distributed therewith (10 m²/g BET-surface).* Preferably, use is made of boron nitride powder which retains boron oxide from its method of preparation. Less favorable surface values are obtained when boron oxide is added to boron nitride which does not contain the specified amounts of boron oxide. However, such mixtures of boron nitride containing boron oxide may be used for the preparation of shaped articles according to the invention, even though the strength values will generally be somewhat lower than when the preferred mixture of boron nitride and boron oxide described above is used.

* BET-surface refers to powder surface increased by gas adsorption as described by Brunauer, Everett and Teller.

Table I below shows the properties of articles made in accordance with the above general procedure.

TABLE I

| Experiment No. | I | II | III | IV |
|---|---|---|---|---|
| Raw material mixture % by wt | | | | |
| BN (15% $B_2O_3$) | 80 | | 55 | 20 |
| BN (0.2% $B_2O_3$) | | 80 | | |
| $Al_2O_3$ (10 micron smallest) | | 20 | 37 | 75 |
| AlN (100 micron smallest) | 20 | | 8 | 5 |
| Mol. ratio AlN/$b_2O_3$ in mixture | 2.8 | — | 1.6 | 2.8 |
| Sintering temp °C | 2100 | 2100 | 2100 | 2100 |
| Sintering pressure kp/cm² | 100 | 100 | 100 | 100 |
| Density % | 83 | 82* | 75* | 75* |
| Transverse rupture strength kp/mm² | 6.1** | 3.2** | 3.2** | 0.42* |
| Hardness kp/mm² | 10.4 | 7.8 | 7.5 | 2.4 |
| Ratio bending strength vertical/parallel | 1.9/1 | 7/1 | 4/1 | 2/1 |
| Ratio thermal expansion vert./parallel | 1/1.2 | 1/55 | | |
| Ratio thermal conductivity vert./parallel | 1/1 | 5/1 | | |

* Signifies the maximum density which can be produced (maximum compacting)
** This represents the bending strength measured with samples which were cut vertical to the direction of pressing On the basis of X-ray diffraction patterns it will be noted that the products of experiments I and II consist of aluminum oxide and boron nitride. However, in spite of having the same chemical compositions the product of experiment I shows better mechanical properties. Furthermore, this material may become still more densified.

A significant difference between the products of experiments I and II consists in the striking tendency of the product from experiment II to orient the layer planes of boron nitride vertical to the direction of pressing. This orientation, which occurs at the boron nitride sintering, makes itself felt in the values of some properties which show a directional dependency, like the transverse rupture strength, the thermal expansion and the thermal conductivity.

In producing the product of experiment III the aluminum nitride assay was decreased and simultaneously the molar ratio $AlN/B_2O_3$ became shifted in favor of the boron oxide by the addition of boron nitride poor in boron oxide. The resulting product, which still has an impressive transverse rupture strength, shows a more pronounced orientation due to the excess of $B_2O_3$. If the aluminum nitride assay is lowered still more, as in the case of experiment IV, the strength drops still more. This indicates that if it is desired for the boron nitride to become practically solidified without any orientation by the reaction products from aluminum nitride and boron oxide, it is necessary to use at least 10 percent, by weight, of aluminum nitride in the reaction mixture and at least two mols of aluminum nitride per mol of boron oxide.

In the experiments shown in Table II below the starting mixtures contained 50 percent, by weight, of aluminum nitride and the products again showed better strengths when the bonding agent of the present invention was used.

TABLE II

| Experiment No. | V | VI | VII |
|---|---|---|---|
| Raw Materials | 50% AlN<br>50% BN<br>(15% $B_2O_3$) | 50% AlN<br>50% BN<br>(15% $B_2O_3$) | 50% AlN<br>50% BN<br>(0.2% $B_2O_3$) |
| Sintering temperature, °C | 2150 | 2150 | 2150 |
| Sintering pressure, kp/cm² | 150 | 150 | 150 |
| Shape | disk | tall cylinder | disk |
| Density, % | 96.5 | 83 | 84 |
| Transverse rupture strength kp/mm² | 13.5 | 5 | 1.1 |
| Sound velocity, km/sec. | 4.3 | 3–4 | not measurable |

The product of experiment V has been sintered so as to give the highest obtainable density. The product of experiment VI could be ground down on rotating discs and became nicely polished, whereas the product from experiment VII, which did not contain the assay of boron oxide required by the present invention, showed poor texture and ruptured grains, even though the articles of both experiments VI and VII showed the same density.

The products from experiments V, VI and VII were not wetted by liquid aluminum at 900°C during a period of 20 hours and were not attacked by it during this period. The product of experiment VI retained its shape when stored in liquid aluminum for a period of 180 hours. The corrosive attack in a cryolite bath in all three experiments was smaller than 0.04 mm per hour. The articles containing some aluminum oxide in the bonding agent did not dissolve faster than an article made from pure aluminum nitride plus boron nitride.

The products from experiments V and VI, in spite of the high aluminum content and in spite of the hard bonding agent could still be processed with chip-removing tools, it thus being possible to produce from them articles of any desired shape needed in the production and processing of aluminum, as well as in various branches of metallurgy and in chemical technology. With significantly higher assays of aluminum nitrides the products of the experiments could no longer be readily machined with chip-removing tools.

What is claimed is:

1. Process for the production of refractory, corrosion-resistant articles which comprises compressing at temperatures of the order of 1,500°–2,200°C and pressures of the order of 30–200 kg/cm² a mixture of 10–60 percent, by weight, of aluminum nitride and 90–40 percent, by weight of boron nitride containing 5–25 percent, by weight, of boron oxide.

2. Process for the production of refractory, corrosion-resistant articles which comprises compressing, at temperatures of the order of 1,500°–2,200°C and pressures of the order of 30–200 kg/cm², 10–60 percent, by weight of aluminum nitride with 90–40 percent, by weight, of boron nitride containing 5–25 percent, by weight, of boron oxide, at least two mols of aluminum nitride per mol of boron oxide being present in said mixture.

* * * * *